Aug. 8, 1967  A. VAN DER LINDEN  3,335,302
TRANSMISSION FOR A SELF-STARTING SYNCHRONOUS MOTOR
Filed June 10, 1965

INVENTOR.
ARIE VAN DER LINDEN
BY
Frank R. Trifari
AGENT

United States Patent Office 3,335,302
Patented Aug. 8, 1967

3,335,302
TRANSMISSION FOR A SELF-STARTING SYNCHRONOUS MOTOR
Arie van der Linden, Dordrecht, Netherlands, assignor to North American Philips Company, Inc., New York, N.Y., a corporation of Delaware
Filed June 10, 1965, Ser. No. 462,817
Claims priority, application Netherlands, June 18, 1964, 64—6,918
4 Claims. (Cl. 310—41)

The invention relates to a low-power self-starting synchronous motor. Such motors can be manufactured in a simple manner and could be employed frequently, for example, in household appliances, record players and similar apparatus, since wear and maintenance are substantially nil, there being omitted such things as carbon brushes, which always require replacement after some time. Moreover, the development of heat is small. These motors have, however, the disadvantage that the direction of rotation is not fixed. That is, when current is supplied to start the motor, the rotor starts oscillating slightly and will then rotate in one direction or the other. It has been proposed, in copending application Ser. No. 462,304, in order to ensure the desired direction of rotation, to provide the rotor with a friction coupling including an eccentric pin, about which a spring-loaded lever is adapted to turn, one arm of said lever supports a weight, whereas the other arm is provided with a pawl, which engages when undesired direction of rotation occurs, a fixedly arranged pawl wheel, whereas when the correct direction of rotation occurs the weight is swung outwardly by the centrifugal force and frictionaly engages and drives an output gear or shaft.

The invention relates to a device of this kind, in which the load is, however, directly connected with the rotor rather than via a friction coupling so that slip between motor and its output means cannot occur.

According to the invention a transmission of the kind set forth is characterized in that the load and rotor are fixed to the same shaft and a pawl is adapted to cooperate with a fixedly arranged ring of elastic material, arranged concentrically with the shaft of the motor, so that the rotor is prevented from turning in the undesired direction. The invention provides the advantage that on starting undesirable noise does not occur. Moreover, the motor can start from any position. During rotation, the pawl is free of the ring, so that undesirable noise and wear of the ring does not occur.

In principle, the pawl can cooperate with any side of the ring, however, it is to be preferred, for structural reasons, to have the pawl cooperate as in the preferred embodiment of the invention, with the inner surface of the ring.

In order to prevent the weight from coming into contact with the ring, the rotor is provided according to a further aspect of the invention with a stop which limits movement of the end of the lever supporting the weight when the rotor turns in the desired direction.

According to a further feature of the invention, the transmission lever and pawl according to the invention may be turned over and the motor and load will then rotate in the opposite direction. This feature will be clearly described hereinafter in connection with the drawing.

The above and other features, objects and advantages of the present invention will be fully understood from the following description considered in connection with the accompanying illustrative drawings.

Figure 1:
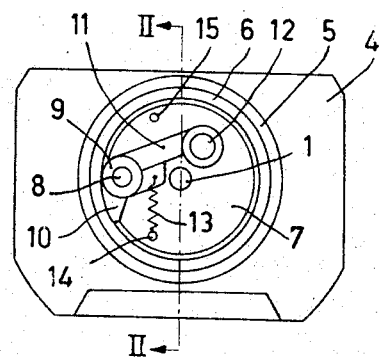
FIG. 1 is a schematic front view of a device used in a self-starting synchronous motor for ensuring one direction of rotation, the motor being in the standstill position.
Figure 2:
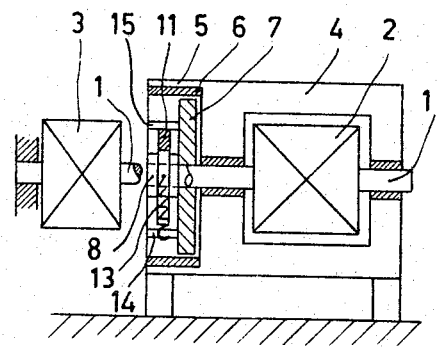
FIG. 2 is a sectional view taken on the line II—II in the direction of the arrow in FIG. 1.

Referring to the figures, reference numeral 1 designates the shaft of a self-starting synchronous motor, on which both a rotor 2 and a load 3 (shown diagrammatically) are fixed. A stator 4 (shown diagrammatically) is provided with a circular collar 5, in which a ring 6 of synthetic rubber of high wear resistance is arranged.

Figure 3:
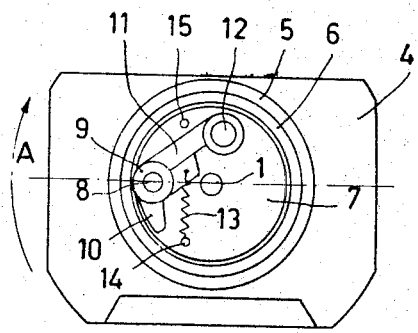
FIG. 3 shows the device of FIG. 1 with the motor rotating and FIG. 4 shows the same device as FIG. 3 for the other direction of rotation.
Figure 4:
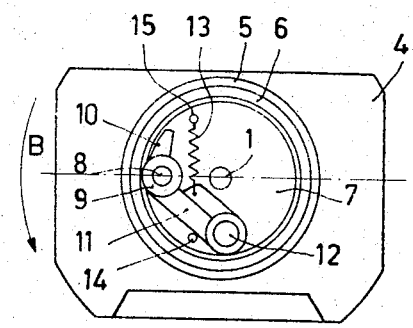

The shaft 1 has rigidly secured to it a disc 7, which has a pin 8 eccentrically arranged with respect to the shaft 1. A lever 9 is pivotally connected with said pin 8. The lever 9 has an arm 10 forming a pawl. The other arm 11 of lever 9 is loaded by a draw spring 13 which is secured to a pin 14, fastened in the disc 7. The disc 7 is furthermore provided with a pin 15 which serves as a stop and which is similar to the pin 14. The distance of the pin 14 from the center line of the shaft 1 is equal to the distance of the pin 15 from said center line, while the straight line connecting the centers of the pins 14 and 15 is at right angles to the horizontal central plane X of the whole assembly (note: FIGS. 3 and 4).

When the motor is at rest (FIG. 1), the pawl 10 penetrates slightly into the rubber ring 6 under the action of the draw spring 13. When the current circuit of the motor is closed, the rotor first tends to perform a small rocking or oscillating motion, which is braked by the pawl 10. If the desired direction or rotation is that indicated by A in FIG. 3, the motor can rotate only in this direction, since the pawl 10 would penetrate further into the rubber ring 6 in the other direction of rotation. First the pawl 10 slides, in desired direction of rotation, along the inner side of the ring 6, but when the number of revolutions of the motor increases, the weight 12 moves outwardly under the action of centrifugal force against the action of the draw spring 13, so that the pawl 10 is spaced from the rubber ring 6. The stop 15 prevents the weight 12 from coming into contact with the rubber ring 6.

When the motor starts, no disturbing noise is produced and the motor can start in the desired direction of rotation from any position. When the motor has once reached its full number of revolutions, the device determining the direction operates quite noiselessly.

If the other direction of rotation of the motor is desired, this can be achieved in a simple manner (see FIG. 4) by changing over the lever 9. The draw spring is then fixed to the pin 15 and pin 14 serves as a stop. Then the motor can rotate only in the direction B.

As shown in the drawing, the pawl always cooperates with the inner side of the ring although, in principle, a different embodiment may be made in which the pawl cooperates with the outer side of the fixed ring. However, the embodiment shown is structurally simple.

The spring 13 may, as an alternative, be a pressure spring in which case it has to be arranged on the other side of the lever 9.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim to be new and useful and secured by Letters Patent of the United States is:

1. A self-starting synchronous motor comprising a stator, a rotor within said stator, a shaft driven by said rotor, a lever eccentric with said shaft and means for pivotally supporting said lever for rotation with said shaft, said lever having a weight at one end and a transverse pawl means projecting from the other end of said lever in one direction, a ring of friction material adjacent the said pawl means, and means for biasing said lever for lightly engaging said pawl means and said ring, said pawl means being pressed against said ring when the rotor tends to rotate in the projecting direction of said pawl means thus prohibiting rotation in said direction only.

2. A self-starting synchronous motor according to claim 1 wherein said ring consists of soft rubber and said pawl means engages the interior circumferential surface of said ring.

3. A self-starting synchronous motor according to claim 2 wherein said means for pivotally supporting said lever is provided with a stop means for engaging the end of said lever having said weight for limiting movement of said lever by centrifugal force acting thereon.

4. A self-starting synchronous motor according to claim 3, wherein said stop means comprises an eccentric pin integral with said means for supporting said lever, said last-mentioned means having a second eccentric pin integral therewith, said second pin being spaced from the pivotal axis of said lever the same distance as said first-named pin; the imaginary straight line connecting the said pins intersecting at right angles the imaginary straight line connecting the axis of said shaft and the pivotal axis of said lever, each said pin being adapted for alternately serving as said stop means and anchor for said means for biasing said lever whereby said lever is changeable for reversing the direction of rotation of said rotor.

No References Cited.

MILTON O. HIRSHFIELD, *Primary Examiner.*

L. L. SMITH, *Assistant Examiner.*